(12) United States Patent
Derakhshan et al.

(10) Patent No.: US 6,173,996 B1
(45) Date of Patent: Jan. 16, 2001

(54) COMPLIANT JOINT WITH A COUPLING MEMBER FOR INTERFACING DISSIMILAR METALS IN X-RAY TUBES

(75) Inventors: Mark O. Derakhshan, West Allis; Thomas G. Ebben, Sullivan, both of WI (US)

(73) Assignee: General Electric Company, Milwaukee, WI (US)

( * ) Notice: Under 35 U.S.C. 154(b), the term of this patent shall be extended for 0 days.

(21) Appl. No.: 09/474,393

(22) Filed: Dec. 29, 1999

Related U.S. Application Data

(62) Division of application No. 08/978,111, filed on Nov. 25, 1997.

(51) Int. Cl.⁷ .................................................. F16L 35/00
(52) U.S. Cl. ..................... 285/114; 285/187; 285/397; 285/382; 285/905; 29/447; 378/144
(58) Field of Search .................................... 285/114, 187, 285/905, 397, 382; 403/28, 29, 30; 378/131, 132, 133, 144; 29/525, 447

(56) References Cited

U.S. PATENT DOCUMENTS

| | | |
|---|---|---|
| 2,239,641 * | 4/1941 | Bierend . |
| 4,281,941 * | 8/1981 | Rottenkolber . |
| 4,377,335 * | 3/1983 | Fannon et al. . |
| 4,569,114 * | 2/1986 | Ashcombe et al. . |
| 4,635,283 * | 1/1987 | Starek et al. . |
| 4,702,503 * | 10/1987 | Koch . |
| 4,866,748 * | 9/1989 | Caraher et al. . |
| 4,910,620 * | 3/1990 | Olbrich . |
| 4,969,172 * | 11/1990 | Fengler et al. . |
| 4,991,991 * | 2/1991 | Ito et al. . |
| 5,074,697 * | 12/1991 | Blanpain et al. . |

\* cited by examiner

Primary Examiner—Dave W. Arola
(74) Attorney, Agent, or Firm—B. Joan Haushalter; Christian G. Cabou; Phyllis Y. Price

(57) ABSTRACT

A method is used for interfacing materials of dissimilar thermal expansion in an X-ray tube. Initially, a first joint is identified, which has a first component to be received into a second component. Typically, the first component has a higher coefficient of expansion than the second component, so the purpose of the invention is to reduce the physical expansion of that component in the joint. A plurality of slots is introduced along the approximate axial length of a coupling member at the joint, to achieve the aforementioned purpose. The coupling member is provided between the two components, and has a thermal expansion rate greater than one component and less than the other component.

14 Claims, 2 Drawing Sheets

Figure 1:
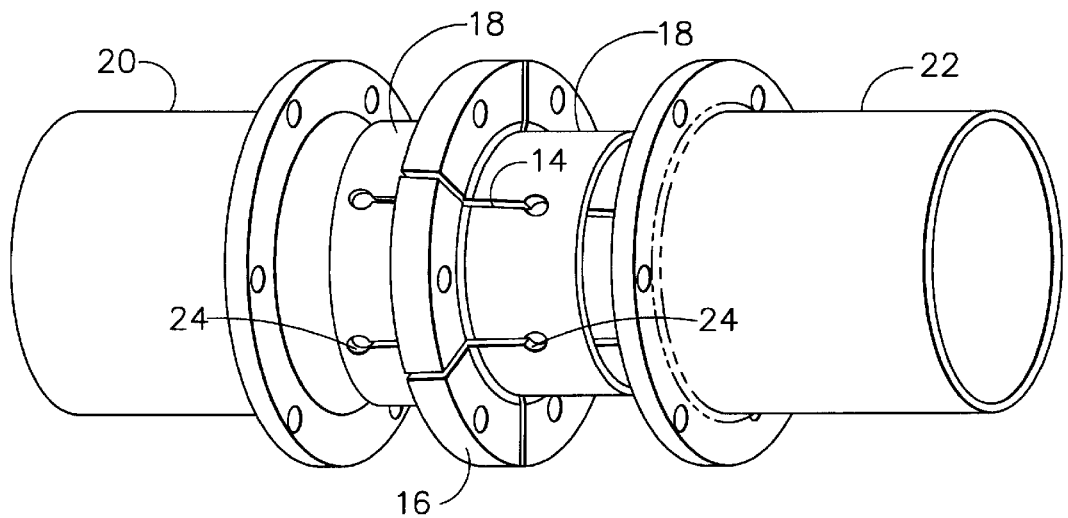

COMPLIANT JOINT WITH A COUPLING MEMBER FOR INTERFACING DISSIMILAR METALS IN X-RAY TUBES

CROSS-REFERENCE TO RELATED APPLICATIONS

This is a divisional of copending application Ser. No. 08/978,111 filed on Nov. 25, 1997.

BACKGROUND OF THE INVENTION

The present invention relates to rotating X-ray tubes and, more particularly, to an interface between dissimilar metals in X-ray tube construction.

The X-ray tube is used in medical diagnostic imaging, medical therapy, and various medical testing and material analysis industries. Typical X-ray tubes are built with a rotating anode structure for the purpose of distributing the heat generated at the focal spot. The anode is rotated by an induction motor consisting of a cylindrical rotor built into an axle that supports the disc shaped anode target, and an iron stator structure with copper windings that surrounds the elongated neck of the X-ray tube that contains the rotor. The rotor of the rotating anode assembly being driven by the stator which surrounds the rotor of the anode assembly is at anodic potential while the stator is sometimes referenced electrically to ground. The X-ray tube cathode provides a focused electron beam which is accelerated across the anode-to-cathode vacuum gap and produces X-rays upon impact with the anode.

In an X-ray tube device with a rotatable anode, the target consists of a disk made of a refractory metal such as tungsten. The X-rays are generated by making the electron beam collide with this target while the target is being rotated at high speed. Rotation of the target is achieved by driving the rotor provided on a support shaft extending from the target. Such an arrangement is typical of rotating X-ray tubes and has remained relatively unchanged in concept of operation since its introduction. However, the operating conditions for x-ray tubes have changed considerably in the last two decades.

State-of-the-art X-ray tubes utilize large (200 mm diameter, 4.5 kg) cantilever mounted, targets rotating at speeds as high as 10,000 rpm. Extremely large temperature changes occur during the operation of the tube, ranging from room temperature to temperatures as high as 1600° C., produced by the deceleration of fast electrons in the tungsten-rhenium layer of the target track.

For the purposes of heat management and safeguarding of components such as bearings, materials with low thermal conductivity are placed in the heat path. In general, such materials have much higher coefficient of thermal expansion than the other materials used in an X-ray tube. However, these components have to be joined to the others in some fashion (i.e., welding, brazing, bolting, etc.). At these joints, the higher level of growth may cause yielding of the components which grow at a smaller rate.

Balance retention at high rotating speeds and high temperatures is extremely crucial. A typical unbalance specification for larger tubes at the time of shipping is 5 g-cm in either the target or rotor planes. Approximately 5% of manufactured tubes with large targets (165 mm diameter, 2.7 kg) are unusable due to high unbalance. A shift of 19 μm of the target center of gravity will produce this amount of unbalance. As anodes become larger and heavier, the amount of shift that will exceed the unbalance specification becomes less. For the latest target size (diameter of approximately 200 mm and mass of approximately 4.5 kg) a shift of 11 μm will exceed the unbalance specification. These small shifts can easily occur because of the large temperature changes, combined with the use of materials that have different coefficients of thermal expansion. Furthermore, the selection of compatible materials for joints is often limited by the operating temperature, material strength and material expansion properties. Additionally, bolted, brazed, and welded joints are a primary source of unbalance.

BRIEF SUMMARY OF THE INVENTION

The present invention provides a method to join two or more components of an X-ray tube having dissimilar thermal expansion rates, for high temperature applications. Use of this method involves utilizing an interference fit while increasing the compliance of the joint with geometric modifications.

In the apparatus shown in the drawings, a method for joining components of an X-ray tube is particularly useful for joining components having dissimilar thermal expansion rates. Initially, a first joint is identified, which has a first component to be received into a second component. Typically, the first component has a higher coefficient of expansion than the second component, so the purpose of the invention is to reduce the physical expansion of that component in the joint. To achieve this purpose, a coupling member is provided between the two components to be joined. The coupling member has a thermal expansion rate greater than one component and less than the other component. A plurality of slots can be introduced along an approximate axial length of the coupling member tp reduce stresses between the first and second components.

BRIEF DESCRIPTION THE DRAWINGS

Figure 2:
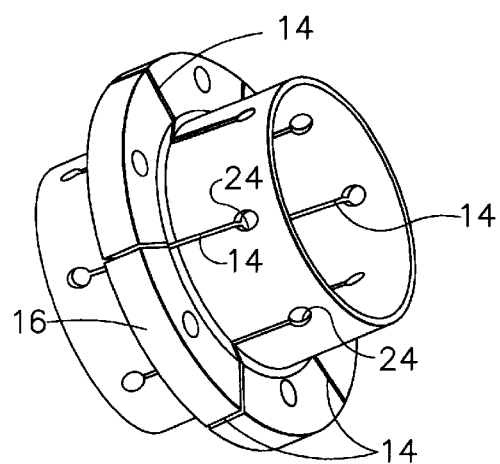
Figure 3:
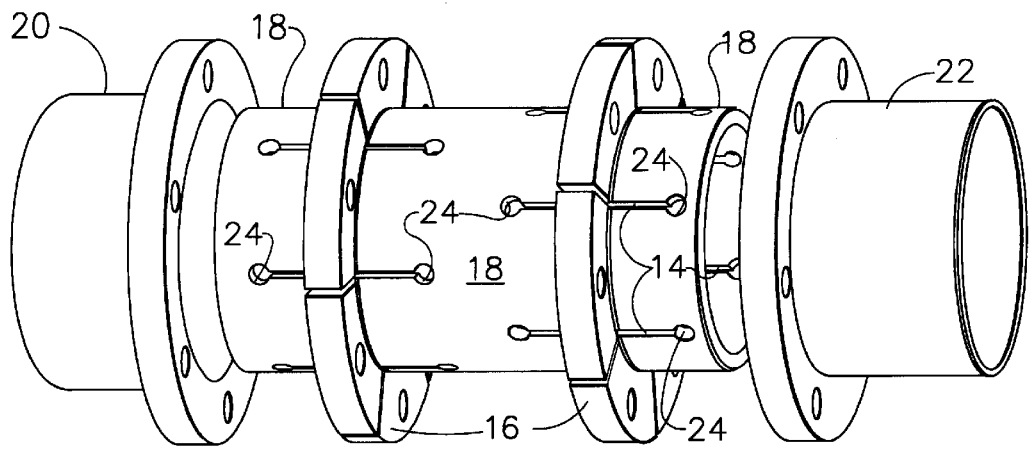
Figure 4:
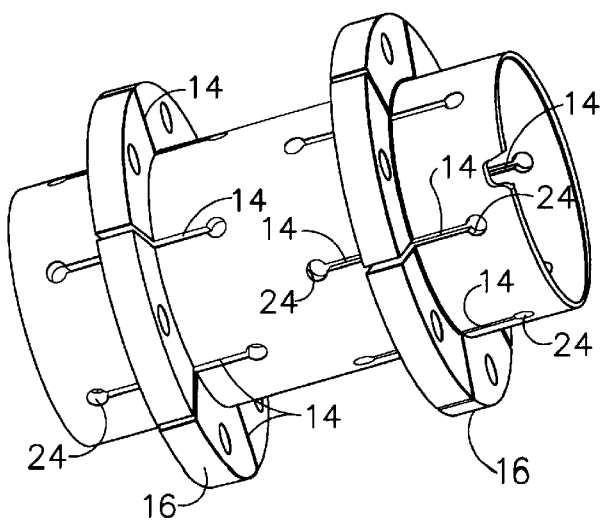

FIGS. 1–4 illustrate joining methods for joining components of an X-ray tube embodying the present invention.

DETAILED DESCRIPTION OF THE INVENTION

The present invention relates to X-ray tubes which employ a rotating anode assembly and a cathode assembly. The purpose of this invention is to improve the method of joining components in the X-ray tube construction, particularly components having dissimilar thermal expansion rates.

With X-ray tubes, in particular, the components that the X-ray tube manufacturer selects and uses are chosen for their X-ray performance. Specifically, X-ray tube components are selected for their advantages in heat distribution, heat generation, x-ray generation, high-speed rotation capabilities, and particularly for heat management and safeguarding of components. Selecting the materials for their X-ray tube performance results in materials having differing thermal expansion properties, an undesirable side effect of the selection criteria. Nonetheless, these dissimilar metals have to be joined. Hence, the X-ray tube manufacturer selects materials for their X-ray tube application, but finds that these materials have dissimilar thermal expansion properties, so then needs to address the problems (imbalance) created by the use of these different materials.

In a typical X-ray tube assembly, the target, rotor assembly, and bearing assembly, for example, are assembled using bolted, brazed and/or welded joints. The present invention provides for a significant improvement in the fit between joined members of the X-ray tube, particularly members having dissimilar thermal expansion rates.

Referring to FIGS. 1–4, the present invention proposes using interference fit assembly in the X-ray tube assembly, to improve joint retention and balance integrity of components at the joints. Compliance of the joint is increased by incorporating modifications which reduce the hoop and radial stiffness and stresses of the joint that occur due to a difference in thermal expansion of the joint materials. The method of the present invention achieves this while maintaining interference fit throughout the operating temperature of the joint.

Referring now to the drawings, a separate slotted member or coupling member 18, as illustrated in FIGS. 1–4, is introduced between two components 20 and 22 having dissimilar thermal expansion rates. The coupling member 18 joins the two components 20 and 22. The coupling member 18 would typically have a coefficient of thermal expansion which is less than that of one member 20 or 22, and greater than that of the other member 22 or 20. Coupling member 18 between the first and second X-ray tube components 20 and 22 nullifies the dissimilar thermal expansion rates of the two components 20 and 22.

The compliance of the joint can be achieved by introducing geometric modifications into the X-ray tube structure. Specifically, slots 14 are introduced along an approximate axial length of the coupling member 18. The slots 14 preferably terminate with an aperture 24 at each end to reduce the stress concentration at the ends of each slot 14.

Such slotting produces compliant captured fingers 16 which are used to mechanically join the member to other members of the joint.

The inclusion of slots 14 in coupling member 18 has the advantage of reducing the physical expansion of that component in the joint. Without the joining method of the present invention, the higher coefficient component would tend to expand faster than the lower coefficient component, adversely affecting balance retention of the final structure. With the joining method of the present invention, rather than being a single less compliant member, the slotted component becomes multiple more compliant members. For example, with six slots 14, the component now comprises six compliant portions 16, rather than a single (non-slotted) stiff component.

The coupling member 18 preferably has a thermal expansion rate greater than the first component 20 of the X-ray tube and less than the second component 22 of the X-ray tube. The slots 14 then have the effect of reducing the amount of physical growth within the joint to produce lower stresses. Of course, if stress analysis and configuration of the joint so dictate, the component of lower coefficient of expansion could be slotted.

The slots 14 are preferably along the axial length of the slotted component 18, to hold the circular integrity of the structure. Furthermore, the slots are typically spaced symmetrically for uniform stresses, although an anti-symmetric slotting can be selected to produce certain stress situations, as desired. The length and number of slots are the control factors for controlling compliance. For example, longer slots will provide more compliance, while shorter slots will decrease the amount of compliance achieved. Likewise, increasing the number of slots causes less expansion or growth, while decreasing the number of slots allows for more expansion than a greater number of slots but still less expansion than a non-slotted component. Consequently, the number of slots, length and distribution can be varied to achieve various realizations.

The invention has been described in detail with particular reference to certain preferred embodiments thereof, but it will be understood that modifications and variations can be effected within the spirit and scope of the invention.

What is claimed is:

1. A method for joining components of an X-ray tube, the components having dissimilar thermal expansion rates, the method comprising the steps of:

identifying a first X-ray tube component;

identifying a second X-ray tube component, the first and second X-ray tube components having dissimilar thermal expansion rates;

providing a coupling member to join the first and second X-ray tube components to nullify the dissimilar thermal expansion rates; and maintaining an interference fit throughout an operating temperature of the coupling member.

2. A method as claimed in claim 1 wherein the coupling member has a thermal expansion rate greater than the first component of the X-ray tube and less than the second component of the X-ray tube.

3. A method as claimed in claim 1 further comprising the step of reducing stresses along the coupling member that occur due to the difference in thermal expansion of the first and second X-ray tube components.

4. A method as claimed in claim 3 wherein the step of reducing stresses further comprises the step of introducing a plurality of slots along an approximate axial length of the coupling member.

5. A method as claimed in claim 4 further comprising the step of terminating each of the plurality of slots with an aperture at each end of each of the plurality of slots.

6. A method as claimed in claim 4 further comprising the step of symmetrically spacing the plurality of slots along the approximate axial length of the coupling member.

7. A method as claimed in claim 1 further comprising the step of reducing physical growth within the coupling member of the component having a greater thermal expansion rate.

8. A compliant joint for interfacing dissimilar metals in an X-ray tube comprising:

a first X-ray tube component;

a second X-ray tube component, the first and second X-ray tube components having dissimilar thermal expansion rates;

a coupling member positioned to join the first and second X-ray tube components to nullify the dissimilar thermal expansion rates; and means for reducing physical growth within the coupling member of the component having a greater thermal expansion rate.

9. A compliant joint as claimed in claim 8 wherein the coupling member has a thermal expansion rate greater than the first component of the X-ray tube and less than the second component of the X-ray tube.

10. A compliant joint as claimed in claim 8 further comprising means for reducing stresses along the coupling member that occur due to the difference in thermal expansion of the first and second X-ray tube components.

11. A compliant joint as claimed in claim 10 wherein the means for reducing stresses comprises a plurality of slots introduced along an approximate axial length of the coupling member.

12. A compliant joint as claimed in claim 11 wherein the plurality of slots comprise a plurality of slots terminating with an aperture at each end of each of the plurality of slots.

13. A compliant joint as claimed in claim 11 wherein the plurality of slots are symmetrically spaced along the approximate axial length of the coupling member.

14. A compliant joint as claimed in claim 8 further comprising an interference fit throughout an operating temperature of the coupling member.

* * * * *